(12) United States Patent
Osawa et al.

(10) Patent No.: US 8,990,092 B2
(45) Date of Patent: Mar. 24, 2015

(54) VOICE RECOGNITION DEVICE

(75) Inventors: Masanobu Osawa, Tokyo (JP); Kazuyuki Nogi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 253 days.

(21) Appl. No.: 13/582,950

(22) PCT Filed: Jun. 28, 2010

(86) PCT No.: PCT/JP2010/004269
§ 371 (c)(1),
(2), (4) Date: Sep. 5, 2012

(87) PCT Pub. No.: WO2012/001730
PCT Pub. Date: Jan. 5, 2012

(65) Prior Publication Data
US 2012/0330655 A1    Dec. 27, 2012

(51) Int. Cl.
*G10L 21/06* (2013.01)
*G10L 15/20* (2006.01)
*G10L 21/0208* (2013.01)

(52) U.S. Cl.
CPC ............. *G10L 15/20* (2013.01); *G10L 21/0208* (2013.01)
USPC .......................................... 704/275; 704/233

(58) Field of Classification Search
USPC ......................................... 704/270, 275, 233
See application file for complete search history.

(56) References Cited

U.S. PATENT DOCUMENTS

| | | | | |
|---|---|---|---|---|
| 5,357,596 A | * | 10/1994 | Takebayashi et al. | 704/275 |
| 5,897,616 A | * | 4/1999 | Kanevsky et al. | 704/246 |
| 5,946,658 A | * | 8/1999 | Miyazawa et al. | 704/275 |
| 6,266,632 B1 | | 7/2001 | Kato et al. | |
| 7,676,372 B1 | | 3/2010 | Oba | |
| 2008/0154591 A1 | | 6/2008 | Kujirai et al. | |

FOREIGN PATENT DOCUMENTS

| | | |
|---|---|---|
| JP | 5-219176 A | 8/1993 |
| JP | 7-64594 A | 3/1995 |
| JP | 7-262490 A | 10/1995 |

(Continued)

OTHER PUBLICATIONS

Sadaoki Furui, "Speech Information Processing", Chapter 5, pp. 126-127, Jun. 1998.

(Continued)

*Primary Examiner* — Abul Azad
(74) *Attorney, Agent, or Firm* — Birch, Stewart, Kolasch & Birch, LLP

(57) ABSTRACT

A voice recognition device includes a voice recognition dictionary in which a word which is recognized as a result of voice recognition on an inputted voice is registered, a reply voice data storage unit for storing recorded voice data about words registered in the voice recognition dictionary, a dialog control unit for, when a word registered in the voice recognition dictionary is recognized, acquiring recorded voice data corresponding to the word from the reply voice data storage unit, a reproduction noise reduction unit for carrying out a process of reducing noise included in the recorded voice data, an amplitude adjusting unit for adjusting an amplitude of the recorded voice data in which the noise has been reduced to a predetermined amplitude level, and a voice reproduction unit for reproducing a voice from the amplitude-adjusted recorded voice data.

4 Claims, 6 Drawing Sheets

(56) References Cited

FOREIGN PATENT DOCUMENTS

| | | |
|---|---|---|
| JP | 10-240283 A | 9/1998 |
| JP | 11-265200 A | 9/1999 |
| JP | 2000-308198 A | 11/2000 |
| JP | 2001-265385 A | 9/2001 |
| JP | 2005-122042 A | 5/2005 |
| JP | 2006-330170 A | 12/2006 |
| JP | 2008-3371 A | 1/2008 |
| JP | 2008-256802 A | 10/2008 |
| JP | 2009-104047 A | 5/2009 |
| WO | WO 2006/083020 A1 | 8/2006 |

OTHER PUBLICATIONS

Steven F. Boll, "Suppression of Acoustic Noise in Speech Using Spectral Subtraction", IEEE Transactions on Acoustics, Speech, and Signal Processing, vol. ASSP-27, No. 2, Apr. 1979, pp. 113-120.

* cited by examiner

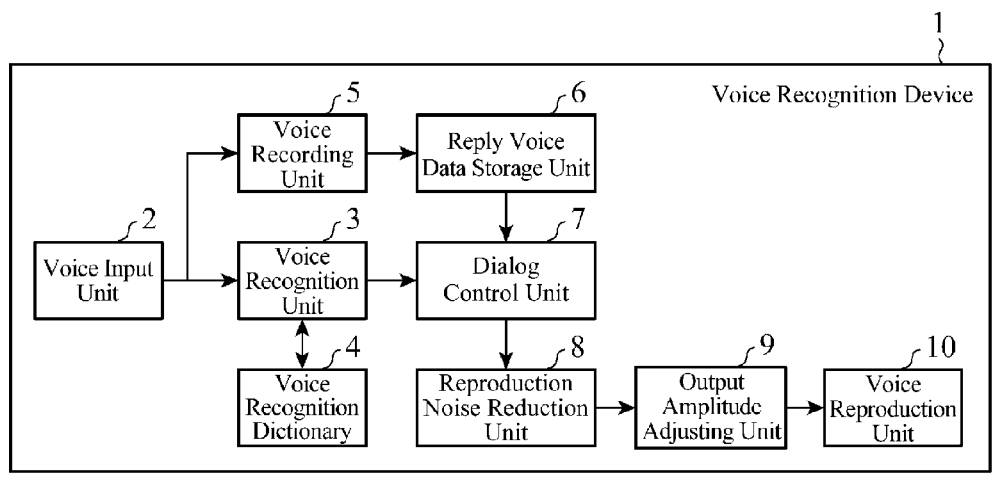

VOICE RECOGNITION DEVICE

FIELD OF THE INVENTION

The present invention relates to a voice recognition device which removes a noise component from voice data inputted thereto and makes an amplitude adjustment to the voice data, thereby providing an improvement in the voice recognition rate.

BACKGROUND OF THE INVENTION

Conventionally, a variety of techniques for providing a voice which does not include noise and which is easy for the user to hear are disclosed. For example, patent reference 1 discloses a technique of using a noise removal parameter which is stored in a noise removing unit and which is set up immediately before weighting is stopped to extract only a voice signal from a signal in which a voice and steady noise are mixed and carry out digital encoding on the voice signal. Further, patent reference 2 discloses a technique which is constructed in such a way as to, when it is hard to catch a voice or a sound outputted from a speaker, allow the user to operate an adjusting unit to change the characteristics of the voice or sound, thereby making it easy for the user to discriminate between a voice and noise or the like. In addition, patent reference 3 discloses a technique of determining an energy value calculated on the basis of a sound source parameter at the time of sound reproduction, selecting a predetermined gain according to the energy value determined, and correcting the volume of the reproduced sound of the voice data according to the selected gain.

RELATED ART DOCUMENT

Patent Reference

Patent reference 1: Japanese Unexamined Patent Application Publication No. Hei 5-219176
Patent reference 2: Japanese Unexamined Patent Application Publication No. Hei 7-262490
Patent reference 3: Japanese Unexamined Patent Application Publication No. Hei 11-265200

SUMMARY OF THE INVENTION

Because the conventional voice recognition and sound reproduction techniques are constructed as above, a problem is that when an inputted voice is registered under high noise levels, an amplitude adjustment is made to a voice onto which noise is piggybacked, and hence a reply voice reproduced has a smaller amplitude than a fixed reply voice.

The present invention is made in order to solve the above-mentioned problem, and it is therefore an object of the present invention to provide a voice recognition device which can remove noise from an inputted voice, and also output a voice having a normalized amplitude.

In accordance with the present invention, there is provided a voice recognition device comprising: a voice recognition unit for carrying out voice recognition on an inputted voice; a voice recognition dictionary in which a word which is recognized as a result of the voice recognition on the inputted voice is registered, a reply voice data storage unit for storing recorded voice data about words registered in the above-mentioned voice recognition dictionary; a dialog control unit for, when the above-mentioned voice recognition unit voice recognizes a word which is registered in the above-mentioned voice recognition dictionary, acquiring recorded voice data corresponding to the word from the above-mentioned reply voice data storage unit; a reproduction noise reduction unit for carrying out a process of reducing noise included in the recorded voice data which are acquired from the above-mentioned reply voice data storage unit by the above-mentioned dialog control unit; an amplitude adjusting unit for adjusting an amplitude of the above-mentioned recorded voice data in which the noise has been reduced by the above-mentioned reproduction noise reduction unit to a predetermined sound amplitude level; and a voice reproduction unit for reproducing a voice from the recorded voice data for reproduction which are outputted from the above-mentioned amplitude adjusting unit.

Further, in accordance with the present invention, there is provided a voice recognition device comprising: a voice recognition unit for carrying out voice recognition on an inputted voice; a voice recognition dictionary in which a word which is recognized as a result of the voice recognition on the inputted voice is registered; a reply voice data storage unit for storing recorded voice data about words registered in the above-mentioned voice recognition dictionary; a dialog control unit for, when the above-mentioned voice recognition unit voice recognizes a word which is registered in the above-mentioned voice recognition dictionary, acquiring recorded voice data corresponding to the word from the above-mentioned reply voice data storage unit; a reproduction noise reduction unit for carrying out a process of reducing noise included in the inputted voice which is stored in the above-mentioned reply voice data storage unit as the above-mentioned recorded voice data; an amplitude adjusting unit for adjusting an amplitude of the above-mentioned recorded voice data which are acquired from the above-mentioned reply voice data storage unit by the above-mentioned dialog control unit to a predetermined sound amplitude level; and a voice reproduction unit for reproducing a voice from the recorded voice data for reproduction which are outputted from the above-mentioned amplitude adjusting unit.

According to the present invention, a voice which is easy for the user to hear can be generated.

BRIEF DESCRIPTION OF THE FIGURES

FIG. 1 is a block diagram showing the structure of a voice recognition device in accordance with Embodiment 1;

FIG. 2 is a view showing an example of registration of a voice recognition result in a voice recognition dictionary in the voice recognition device in accordance with Embodiment 1;

FIG. 3 is a view showing an example of registration of voice data in a reply voice data storage unit in the voice recognition device in accordance with Embodiment 1;

EMBODIMENTS OF THE INVENTION

Figure 4:
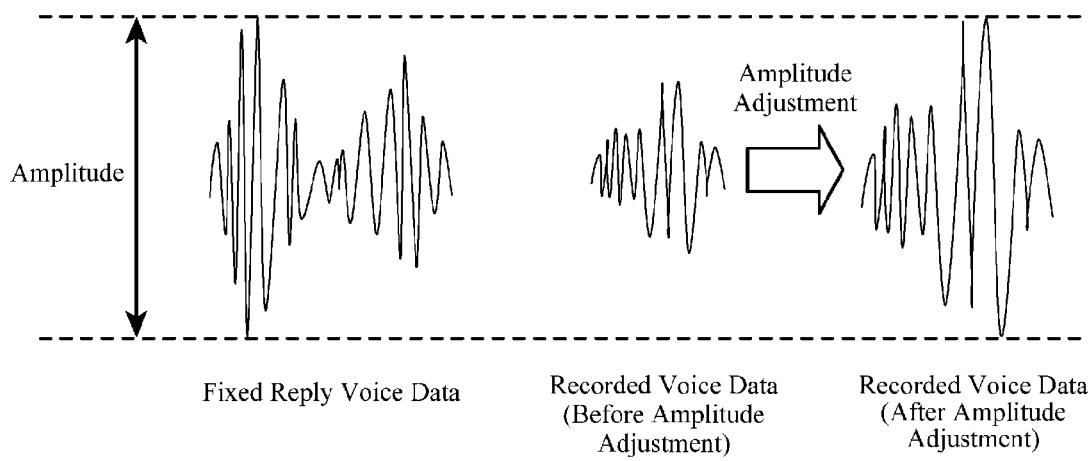
FIG. 4 is an explanatory drawing showing an amplitude adjustment made by the voice recognition device in accordance with Embodiment 1.

Hereafter, in order to explain this invention in greater detail, the preferred embodiments of the present invention will be described with reference to the accompanying drawings.

Embodiment 1

FIG. 1 is a block diagram showing the structure of a voice recognition device in accordance with Embodiment 1. The voice recognition device 1 in accordance with Embodiment 1 is comprised of a voice input unit 2, a voice recognition unit 3, a voice recognition dictionary 4, a voice recording unit 5, a reply voice data storage unit 6, a dialog control unit 7, a reproduction noise reduction unit 8, an output amplitude adjusting unit (amplitude adjusting unit) 9, and a voice reproduction unit 10.

The voice input unit 2 accepts an input of a voice uttered by a user and outputs voice data. In performing a registering process on the voice recognition dictionary 4, the voice recognition unit 3 carries out voice recognition on the voice data inputted from the voice input unit 2, and registers the result of the voice recognition in the voice recognition dictionary 4 while bringing a specific ID into correspondence with the voice recognition result. The voice recognition unit carries out the voice recognition by using Hidden Markov Model disclosed by, for example, the following reference 1. FIG. 2 is a view showing an example of the registration of the voice recognition result in the voice recognition dictionary 4 in the voice recognition device in accordance with Embodiment 1. For example, the voice recognition result is a sequence of phonemes. In addition, in performing a process of retrieving recorded voice data on the basis of the user's utterance, the voice recognition unit 3 carries out voice recognition on the voice data inputted from the voice input unit 2 to acquire an ID corresponding to each word which the voice recognition unit has recognized by making a reference to the voice recognition dictionary 4. Each word includes not only a word used in Japanese or in a foreign language, but also a combination of numerals, alphabets, symbols, and so on (e.g. a part number).

[Reference 1]

Sadaoki Furui, "Speech information processing", Chapter 5

The voice recognition dictionary 4 stores the voice recognition result acquired by the voice recognition unit 3 therein together with the specific ID. The voice recording unit 5 records the voice data inputted from the voice input unit 2, and registers the voice data recorded thereby in the reply voice data storage unit 6. The voice recording unit carries out the registration of the recorded voice data while assigning the same ID as the ID which is brought into correspondence with the voice recognition result by the voice recognition unit 3 to the recorded voice data. The reply voice data storage unit 6 stores the recorded voice data therein together with the specific ID. FIG. 3 is a view showing an example of the registration of the voice data in the reply voice data storage unit 6 in the voice recognition device in accordance with Embodiment 1.

When the user utters a voice having the same descriptions as those of voice data registered in the voice recognition dictionary 4, the dialog control unit 7 acquires the ID of the voice recognition result having the same descriptions as the user's utterance from the voice recognition unit 3, and acquires the recorded voice data having the same ID from the reply voice data storage unit 6. The reproduction noise reduction unit 8 removes noise from the recorded voice data inputted from the dialog control unit 7. As a noise removing method, a spectral subtraction method disclosed by, for example, reference 1 (pp. 126) and reference 2, or the like can be applied. The reproduction noise reduction unit carries out the noise removing process on the voice data for reproduction in such a way that a voice which is not unnatural from the viewpoint of the person's audibility is acquired.

[Reference 2]

S. F, Boll. "Suppression of acoustic noise in speech using spectral subtraction," IEEE Trans. Acoust. Speech Signal Process., vol. ASSP-27, no. 2, pp. 113-120, 1979.

The output amplitude adjusting unit 9 adjusts the amplitude of the recorded voice data from which noise has been removed by the reproduction noise reduction unit 8 to a predetermined sound amplitude level. A concrete example of the amplitude adjustment is shown in FIG. 4. In the example of FIG. 4, the output amplitude adjusting unit carries out the amplitude adjustment in such a way that the recorded voice data from which noise has been removed have a maximum amplitude which is the same as a maximum amplitude of fixed reply voice data. The voice reproduction unit 10 reproduces a reply voice from the recorded voice data on which the amplitude adjustment has been carried out, and outputs the reply voice.

Figure 5:
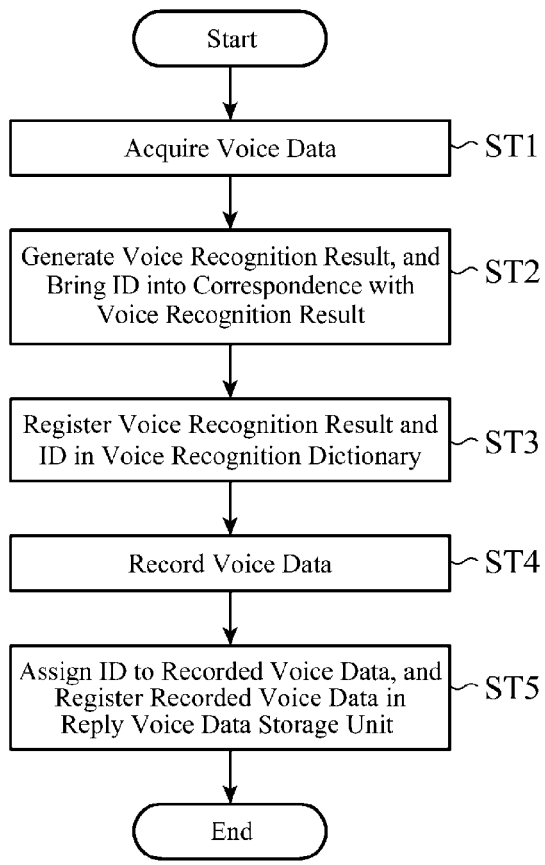
FIG. 5 is a flow chart showing the operation of the voice recognition device in accordance with Embodiment 1.
Figure 6:
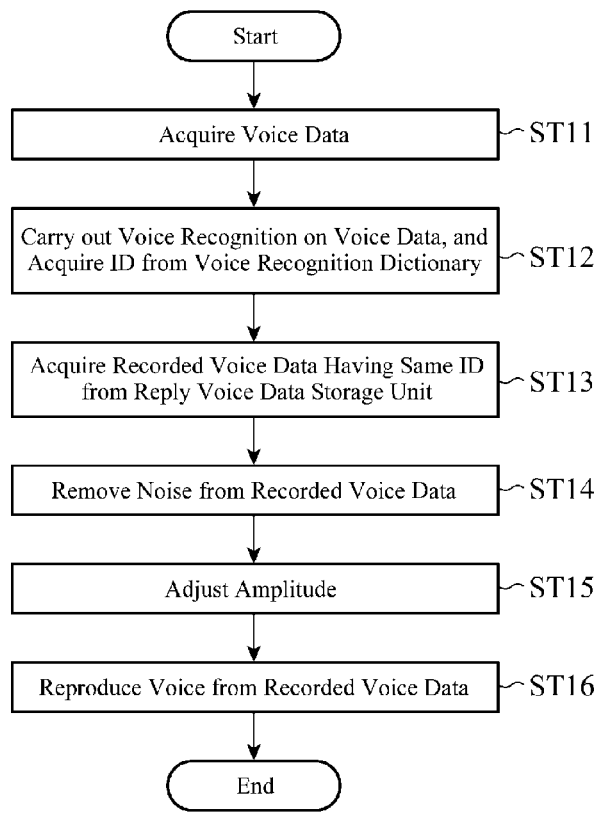
FIG. 6 is a flow chart showing the operation of the voice recognition device in accordance with Embodiment 1.

Next, the operation of the voice recognition device 1 will be explained. FIGS. 5 and 6 are a flow chart showing the operation of the voice recognition device in accordance with Embodiment 1. The operation of the voice recognition device 1 will be explained by dividing this operation into a process shown in FIG. 5 of registering voice data in the voice recognition dictionary 4 and the reply voice data storage unit 6, and a process shown in FIG. 6 of retrieving recorded voice data on the basis of the user's utterance.

In performing the process shown in FIG. 5 of registering voice data in the voice recognition dictionary 4 and the reply voice data storage unit 6, when the user utters a voice in a state in which the voice recognition device can record voice data, the voice input unit 2 A/D converts the user's voice to acquire data in, for example, a PCM (Pulse Code Modulation) form and outputs this data as voice data (step ST1). The voice recognition unit 3 carries out voice recognition on the voice data inputted, in step ST1, from the voice input unit 2 to generate a voice recognition result, and also brings a specific ID into correspondence with the voice recognition result generated thereby (step ST2). The voice recognition unit carries out the voice recognition by using, for example, Hidden Markov Model. The voice recognition unit 3 further registers the voice recognition result generate thereby and the ID in the voice recognition dictionary 4 (step ST3).

On the other hand, the voice recording unit 5 records the voice data inputted, in step ST1, from the voice input unit 2 (step ST4), and assigns the same ID as that which is registered, in step ST3, in the voice recognition dictionary 4 to the recorded voice data, and registers this recorded voice data in the reply voice data storage unit 6 (step ST5).

Next, the process of retrieving recorded voice data on the basis of the user's utterance will be explained with reference to FIG. 6. Hereafter, a case in which the user utters a voice having the same descriptions as voice data registered in the voice recognition dictionary 4, and the voice recognition device executes a command or retrieves recorded voice data will be explained. When the user utters a voice, the voice input unit 2 acquires the user's voice and outputs this voice as voice data (step ST11). The voice recognition unit 3 carries out voice recognition on the voice data inputted, in step ST11, from the voice input unit 2, acquires the ID corresponding to each word which the voice recognition unit has recognized from the voice recognition dictionary 4, and outputs the ID acquired thereby to the dialog control unit 7 (step ST12). The voice recognition unit carries out the voice recognition by using, for example, Hidden Markov Model.

The dialog control unit 7 refers to the reply voice data storage unit 6 to acquire the recorded voice data having the same ID as the ID inputted in step ST12, and outputs the recorded voice data to the reproduction noise reduction unit 8 (step ST13). The reproduction noise reduction unit 8 removes noise from the recorded voice data inputted in step ST13 according to the noise removing method, such as a spectral subtraction method, in such a way that a voice which is not unnatural from the viewpoint of the person's audibility is acquired, and outputs the recorded voice data to the output amplitude adjusting unit 9 (step ST14). The output amplitude adjusting unit 9 adjusts the amplitude of the recorded voice data inputted in step ST14, from which noise has been removed, and outputs the recorded voice data to the voice reproduction unit 10 (step ST15). The voice reproduction unit 10 reproduces a voice from the recorded voice data inputted in step ST15 (step ST16).

As mentioned above, because the voice recognition device in accordance with this Embodiment is constructed in such a way as to adjust the amplitude of recorded voice data to a predetermined sound amplitude level by using the output amplitude adjusting unit 9 after reducing noise in the recorded voice data by using the reproduction noise reduction unit 8, the voice recognition device can make a reply voice reproduced by the voice reproduction unit 10 have the same amplitude as a fixed reply voice, thereby being able to reproduce a voice which is easy for the user to hear.

Embodiment 2

Figure 7:
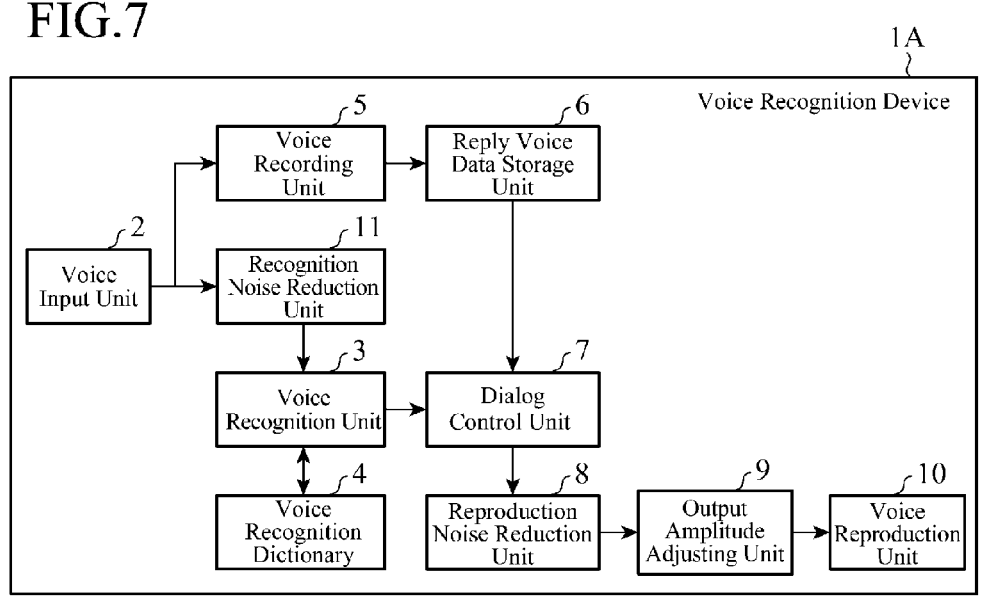
FIG. 7 is a block diagram showing the structure of a voice recognition device in accordance with Embodiment 2.

FIG. 7 is a block diagram showing the structure of a voice recognition device in accordance with Embodiment 2. The voice recognition device 1A in accordance with this Embodiment 2 includes a recognition noise reduction unit 11 in addition to the components of the voice recognition device 1 shown in Embodiment 1. The same components as those of the voice recognition device in accordance with Embodiment 1 or like components are designated by the same reference numerals as those used in Embodiment 1, and the explanation of the components will be omitted or simplified hereafter.

The recognition noise reduction unit 11 is placed between a voice input unit 2 and a voice recognition unit 3, and performs a noise removing process on voice data inputted from the voice input unit 2. As a noise removing method, a spectral subtraction method disclosed by, for example, reference 1 and reference 2, or the like can be applied. The recognition noise reduction unit carries out the noise removing process on voice data for recognition in such a way that the recognition rate in the voice recognition unit 3 is improved.

Figure 8:
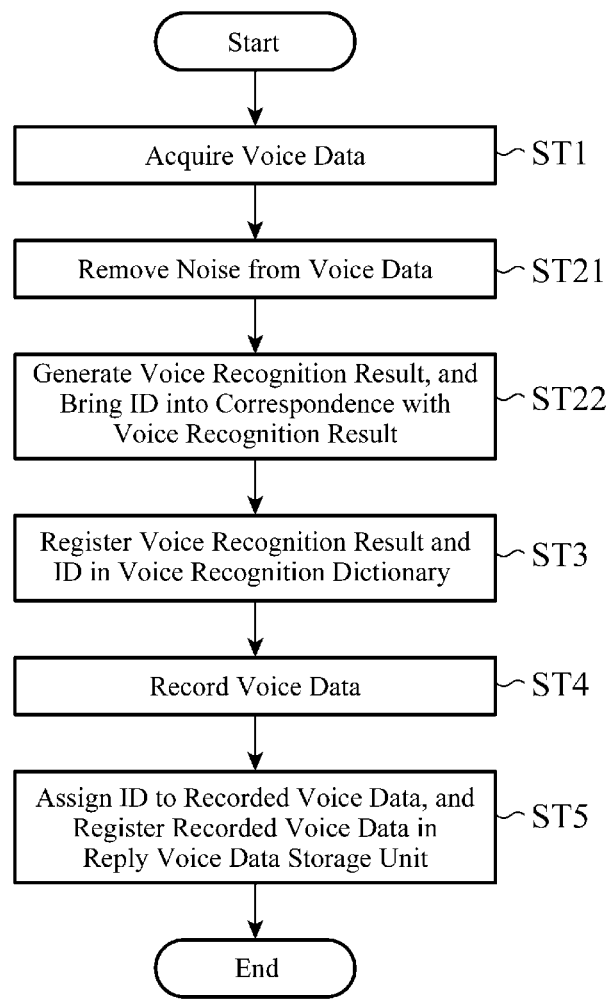
FIG. 8 is a flow chart showing the operation of the voice recognition device in accordance with Embodiment 2.
Figure 9:
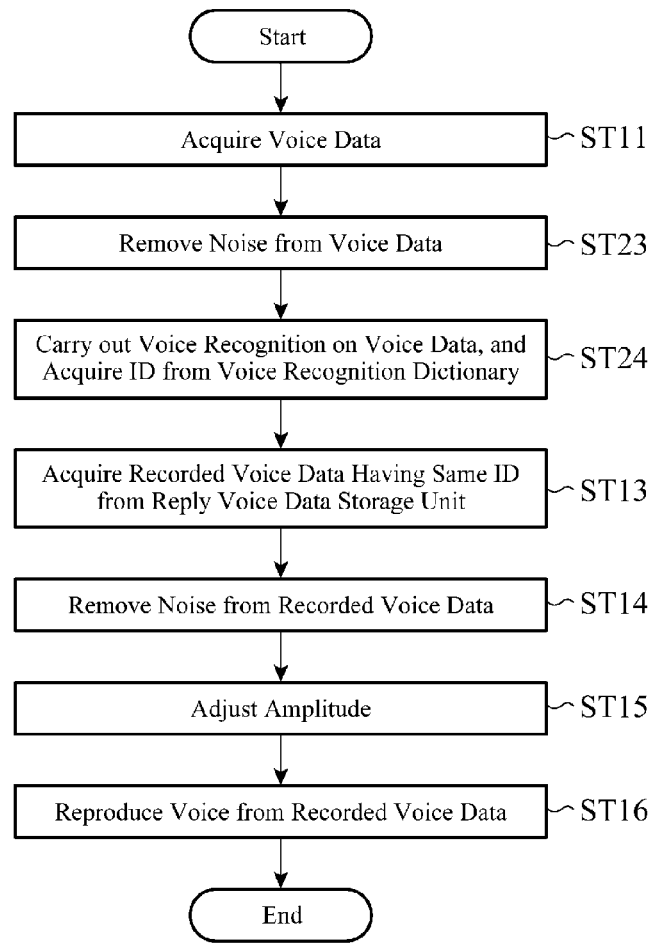
FIG. 9 is a flow chart showing the operation of the voice recognition device in accordance with Embodiment 2.

Next, an explanation will be made focusing on a process of registering voice data in a voice recognition dictionary 4 and a process of retrieving recorded voice data on the basis of a user's utterance in the voice recognition device 1A in accordance with Embodiment 2. FIGS. 8 and 9 are flow charts showing the operation of the voice recognition device in accordance with Embodiment 2. The same steps as those of the voice recognition device in accordance with Embodiment 1 are designated by the same reference characters as those used in FIGS. 5 and 6, and the explanation of the steps will be omitted or simplified hereafter.

The process of registering voice data in the voice recognition dictionary 4 will be explained first with reference to FIG. 8. When the voice input unit 2, in step ST1, outputs voice data acquired thereby, the recognition noise reduction unit 11 carries out the noise removing process on the voice data according to the noise removing method, such as a spectral subtraction method, in such a way that a voice suitable for voice recognition is acquired, and outputs the voice data to the voice recognition unit 3 (step ST21). The voice recognition unit 3 carries out voice recognition on the voice data inputted in step ST21, from which noise has been removed, to generate a voice recognition result, and also brings a specific ID into correspondence with the voice recognition result generated thereby (step ST22). The voice recognition unit carries out the voice recognition by using, for example, Hidden Markov Model. The voice recognition unit 3 further registers the voice recognition result generated thereby and the ID in the voice recognition dictionary 4 (step ST3). The process of registering the voice data in a reply voice data storage unit 6 is the same as that in accordance with Embodiment 1.

Next, the process of retrieving recorded voice data on the basis of the user's utterance will be explained with reference to FIG. 9. Hereafter, a case in which the user utters a voice having the same descriptions as voice data registered in the voice recognition dictionary 4, and the voice recognition device executes a command or retrieves recorded voice data will be explained. When the voice input unit 2, in step ST11, outputs voice data acquired thereby, the recognition noise reduction unit 11 carries out the noise removing process on the voice data according to the noise removing method, such as a spectral subtraction method, in such a way that a voice suitable for voice recognition is acquired, and outputs the voice data to the voice recognition unit 3 (step ST23). The voice recognition unit 3 carries out voice recognition on the voice data inputted in step ST23 from which noise has been removed to acquire the ID corresponding to each word which the voice recognition unit has recognized from the voice recognition dictionary 4, and outputs the ID acquired thereby to a dialog control unit 7 (step ST24). The voice recognition unit carries out the voice recognition by using, for example, Hidden Markov Model. Subsequent processes are the same as those in accordance with Embodiment 1.

As mentioned above, because the voice recognition in accordance with this Embodiment 2 is constructed in such a way as to include the recognition noise reduction unit 11 for carrying out the noise removing process before the voice recognition carries out voice recognition, the voice recognition can provide an improvement in the recognition rate while preventing the noise reduction process for recognition and the noise reduction process for reproduction from doubly being performed on the voice data, thereby avoiding degradation in the sound quality.

Embodiment 3

Figure 10:
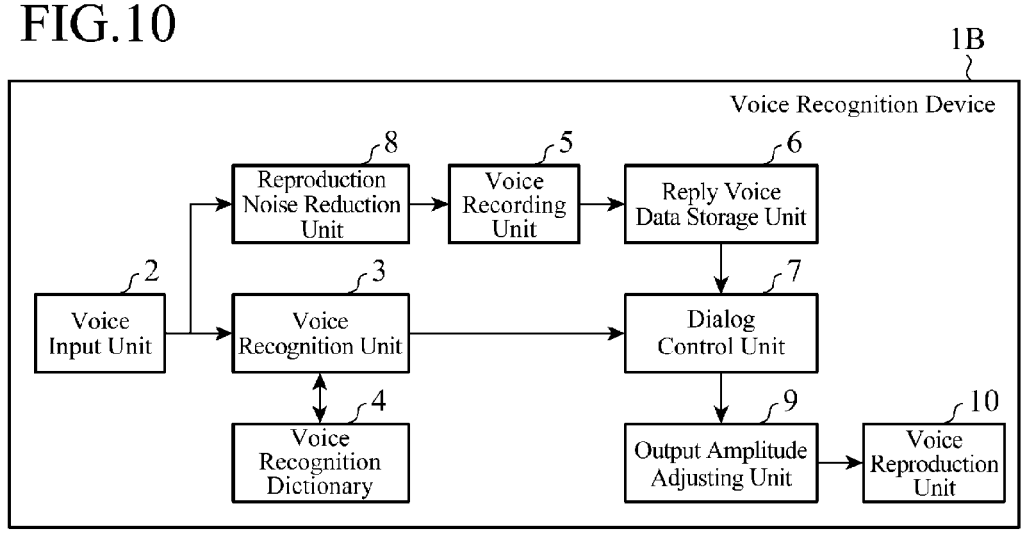
FIG. 10 is a block diagram showing the structure of a voice recognition device in accordance with Embodiment 3.

FIG. 10 is a block diagram showing the structure of a voice recognition device in accordance with Embodiment 3. In this Embodiment 3, the reproduction noise reduction unit 8 of the voice recognition device 1 in accordance with Embodiment 1 is placed between a voice input unit 2 and a voice recording unit 5. The same components as those of the voice recognition device in accordance with Embodiment 1 or like components are designated by the same reference numerals as those used in Embodiment 1, and the explanation of the components will be omitted or simplified hereafter.

When removing noise from voice data before recording the voice data the voice recognition device does not carry out a noise removing process on recorded voice data outputted from a dialog control unit 7, as shown in FIG. 10. This is because the voice recognition device prevents the noise removing process from doubly being performed on recorded voice data for reproduction.

Figure 11:
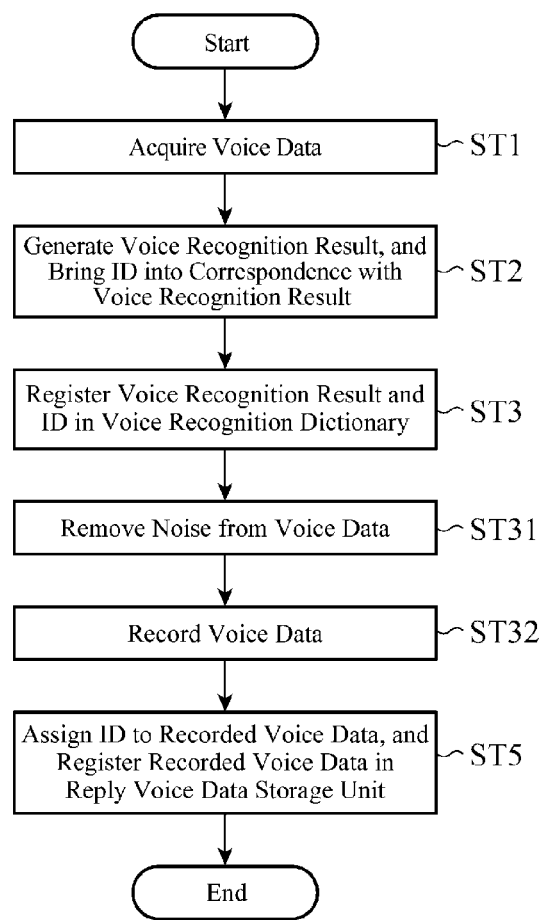
FIG. 11 is a flow chart showing the operation of the voice recognition device in accordance with Embodiment 3.

Next, an operation of registering voice data in a reply voice data storage unit 6 in the voice recognition device 1B in accordance with Embodiment 3 will be explained. FIG. 11 is a flow chart showing the operation of the voice recognition device in accordance with Embodiment 3. The same steps as those of the voice recognition device in accordance with Embodiment 1 are designated by the same reference characters as those used in FIG. 5, and the explanation of the steps will be omitted or simplified hereafter.

When the voice input unit 2, in step ST1, outputs voice data, the reproduction noise reduction unit 8 removes noise from the voice data inputted according to a noise removing method, such as a spectral subtraction method, in such a way that a voice which is not unnatural from the viewpoint of the person's audibility is acquired, and outputs the voice data to a voice recording unit 5 (step ST31). The voice recording unit 5 records the voice data inputted, in step ST31, from the reproduction noise reduction unit 8 from which noise has been removed (step ST32), and assigns the same ID as that which is registered, in step ST3, in the voice recognition dictionary 4 to the recorded voice data, and registers this recorded voice data in a reply voice data storage unit 6 (step ST5).

A process of registering the voice data in the voice recognition dictionary 4 is the same as that in accordance with Embodiment 1. Further, a process of retrieving recorded voice data on the basis of a user's utterance corresponds to the process shown in the flow chart of FIG. 6 of Embodiment 1 from which the process of step ST14 of removing noise from recorded voice data is eliminated. More specifically, the dialog control unit 7 outputs recorded voice data acquired thereby to an output amplitude adjusting unit 9, and the output amplitude adjusting unit 9 adjusts the amplitude of the recorded voice data and outputs this recorded voice data to a voice reproduction unit 10.

As mentioned above, because the voice recognition device in accordance with this Embodiment 3 is constructed in such a way as to include the reproduction noise reduction unit 8 disposed between the voice input unit 2 and the voice recording unit 5, and register recorded voice data on which the noise reduction process has been performed in the reply voice data storage unit 6, the voice recognition device does not have to perform the noise reduction process every time when reproducing a voice from recorded voice data, thereby being able to reduce the amount of information to be processed.

Embodiment 4

Figure 12:
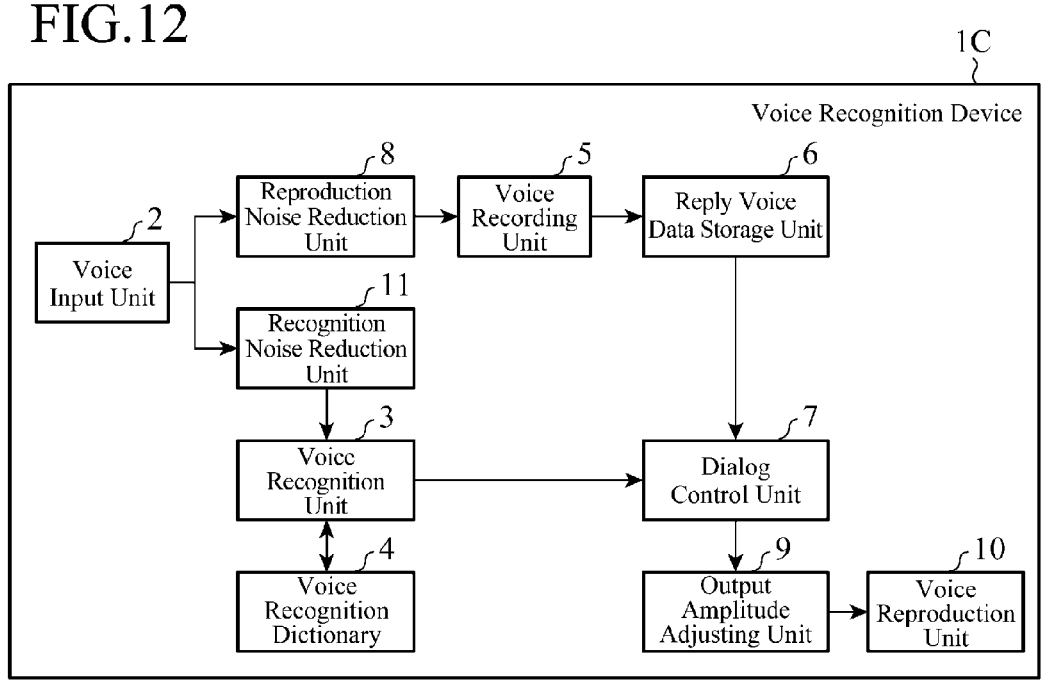
FIG. 12 is a block diagram showing the structure of a voice recognition device in accordance with Embodiment 4.

FIG. 12 is a block diagram showing the structure of a voice recognition device in accordance with Embodiment 4. In the voice recognition device 1C in accordance with this Embodiment 4, the reproduction noise reduction unit 8 of the voice recognition device 1A shown in Embodiment 2 is placed between a voice input unit 2 and a voice recording unit 5. The voice recognition device 1C in accordance with Embodiment 4 has the same components as those in accordance with Embodiment 2, and the explanation of the components will be omitted hereafter. Further, in the operation of the voice recognition device 1C in accordance with this Embodiment 4, a process of registering voice data in a voice recognition dictionary 4 is the same as that in accordance with Embodiment 2, and a process of registering voice data in a reply voice data storage unit 6 and a process of retrieving recorded voice data on the basis of a user's utterance are the same as those in accordance with Embodiment 3.

As mentioned above, because the voice recognition device in accordance with this Embodiment 4 is constructed in such a way as to include the reproduction noise reduction unit 8 disposed between the voice input unit 2 and the voice recording unit 5, and register recorded voice data on which the noise reduction process has been performed in the reply voice data storage unit 6, the voice recognition device does not have to perform the noise reduction process every time when reproducing a voice from recorded voice data, thereby being able to reduce the amount of information to be processed. In addition, because the voice recognition device in accordance with this Embodiment 4 is constructed in such a way as to include a recognition noise reduction unit 11 disposed between the voice input unit 2 and the voice recording unit 5, and register recorded voice data on which the noise reduction process has been performed in the voice recognition dictionary 4, the voice recognition device can provide an improvement in the recognition rate of the voice recognition on voice data.

In Embodiments 1 to 4, although the structure of using the same method, such as a spectrum subtraction method, for both the noise reduction process for reproduction and the noise reduction process for recognition is shown, even when the same method is used, the voice recognition device can carry out noise removal suitable for the noise reduction process for reproduction or for recognition by adjusting the parameters.

INDUSTRIAL APPLICABILITY

Because the voice recognition device in accordance with the present invention can reproduce a voice which does not include any noise and which has an amplitude close to that of fixed reply voice data, the voice recognition device in accordance with the present invention can be applied to a navigation device and so on, and can be used for provision of a voice which is easy for the user to hear.

The invention claimed is:

1. A voice recognition device comprising:
 a voice recognition unit for carrying out voice recognition on an inputted voice;
 a voice recognition dictionary in which each word which is spoken by the inputted voice and recognized as a result of the voice recognition on the inputted voice is registered;
 a reply voice data storage unit for storing recorded voice data of each word spoken by the inputted voice which is registered in said voice recognition dictionary;
 a dialog control unit for, when said voice recognition unit voice recognizes a word which is registered in said voice recognition dictionary, acquiring recorded voice data corresponding to the word from said reply voice data storage unit;
 a reproduction noise reduction unit for carrying out a process of reducing noise included in the recorded voice data which are acquired from said reply voice data storage unit by said dialog control unit;
 an amplitude adjusting unit for adjusting an amplitude of said recorded voice data in which the noise has been reduced by said reproduction noise reduction unit to a predetermined sound amplitude level; and a voice reproduction unit for reproducing a voice from the recorded voice data for reproduction which are outputted from said amplitude adjusting unit.

2. The voice recognition device according to claim 1, wherein said voice recognition device includes a recognition noise reduction unit for carrying out a process of reducing noise included in the inputted voice inputted to said voice recognition unit.

3. A voice recognition device comprising:
- a voice recognition unit for carrying out voice recognition on an inputted voice;
- a voice recognition dictionary in which each word which is spoken by the inputted voice and recognized as a result of the voice recognition on the inputted voice is registered;
- a reply voice data storage unit for storing recorded voice data of each word spoken by the inputted voice which is registered in said voice recognition dictionary;
- a dialog control unit for, when said voice recognition unit voice recognizes a word which is registered in said voice recognition dictionary, acquiring recorded voice data corresponding to the word from said reply voice data storage unit;
- a reproduction noise reduction unit for carrying out a process of reducing noise included in the inputted voice which is stored in said reply voice data storage unit as said recorded voice data;
- an amplitude adjusting unit for adjusting an amplitude of said recorded voice data which are acquired from said reply voice data storage unit by said dialog control unit to a predetermined sound amplitude level; and
- a voice reproduction unit for reproducing a voice from the recorded voice data for reproduction which are outputted from said amplitude adjusting unit.

4. The voice recognition device according to claim 3, wherein said voice recognition device includes a recognition noise reduction unit for carrying out a process of reducing noise included in the inputted voice inputted to said voice recognition unit.

* * * * *